Patented Mar. 28, 1939

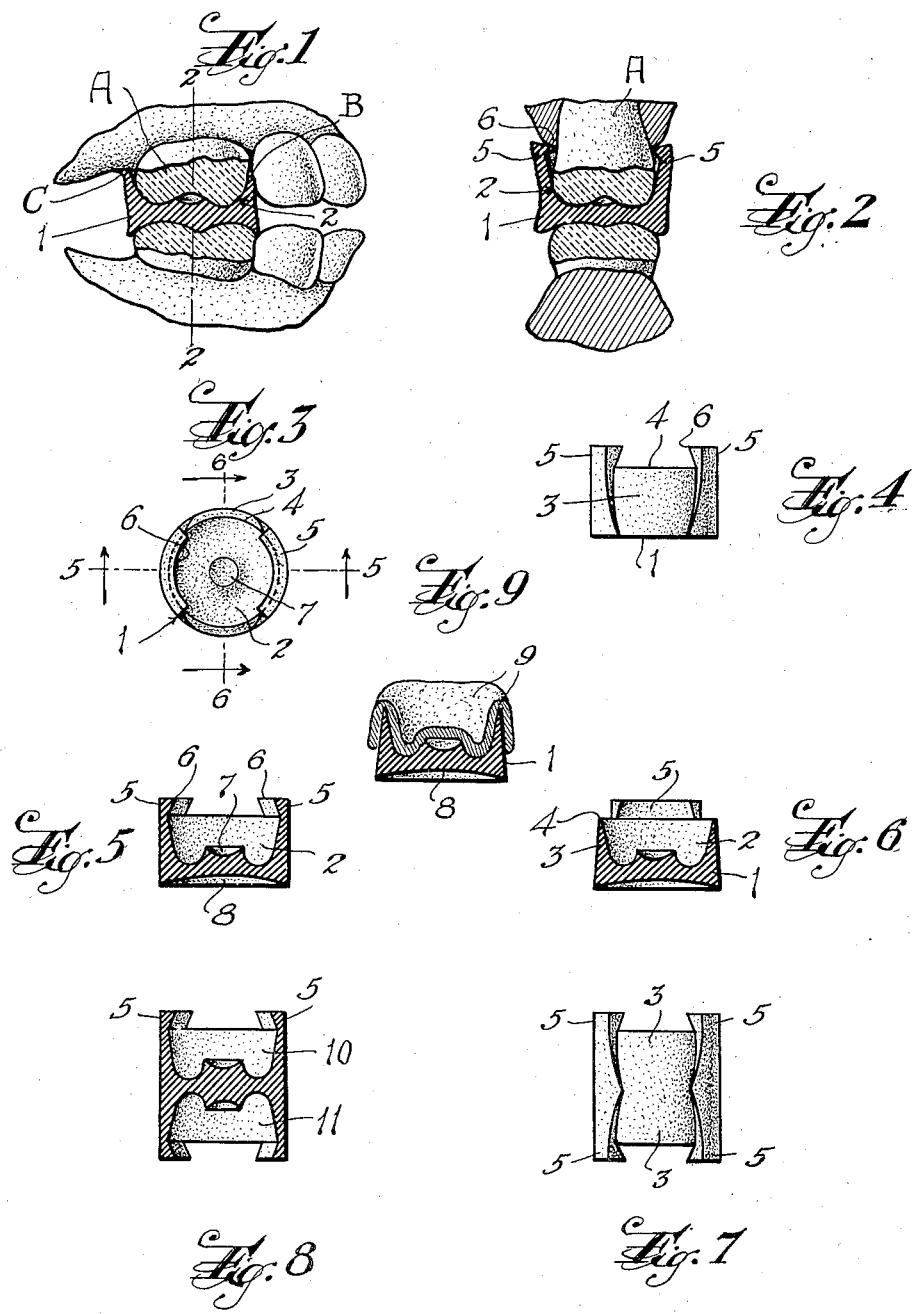

2,152,391

UNITED STATES PATENT OFFICE 2,152,391

DENTAL APPLIANCE

Charles A. Spahn, Newark, N. J., assignor to The Orthodontists Supply Co. Inc., Newark, N. J., a corporation of New Jersey Application January 21, 1937, Serial No. 121,524

2 Claims. (Cl. 32—34)

In the practice of orthodontia, one operation consists in applying a band to a tooth for the attachment of tooth straightening appliances to the tooth. Such a band must ordinarily remain on a tooth for a considerable period of time, and accordingly it is necessary that the tooth be in absolutely sanitary and dry condition before the band is applied so as to reduce to the minimum the possibility of decay of the tooth under the band and to assure secure cementing of the band to the tooth.

Ordinarily, after a tooth has been prepared for the tooth band, the operator's time and attention are required in making further preparation for applying the band, for example in mixing cement, and unless some provision is made to prevent it, the tooth may become moistened or contaminated in the interim as by saliva.

Heretofore, only inefficient equipment, such as paper or cotton wads has been available, and therefore the operator has been compelled to work rapidly and under great anxiety and difficulty which too frequently has resulted in faulty operations.

Also in the practice of dentistry, often it is desirable to have means for easily and efficiently applying medicine to a tooth or the gums, for example astringent solutions.

In many cases, especially in children's mouths, teeth fail or are slow to erupt through the gums, and it is desirable to have means for exercising the gums to expedite eruption of the teeth therethrough.

Therefore, one object of my invention is to provide a dental appliance which may be used for maintaining a tooth dry during the operation of applying a band thereto; which may also be utilized as an applicator for treating a tooth or the gums with medicinal solutions; and which may also serve as an exercising instrument to expedite eruption of teeth.

Other objects are to provide an appliance which shall be capable of encasing a tooth in the mouth and maintaining it in dry condition for as long as may be necessary after it has been prepared for the reception of the tooth band and during the time the operator may be engaged in other incidental operations preparatory to applying a band to the tooth, and to provide such a device which may be held in position over a tooth by gripping of the device by and between the jaws of the patient.

A further object is to provide a cup-like device to be held in position by and between the jaws of the patient and which may serve as a container for a medicinal solution and receive within it a tooth to be treated, and the device may surround the tooth and gums adjacent the tooth to hold the medicinal solution in contact with the tooth and gums.

Another object is to provide such a device formed of resilient material to be gripped between the jaws of a patient so that repeated squeezing of the device between the jaws and over the gums adjacent an unerupted tooth will exercise the gums and facilitate eruption of the tooth.

Other objects are to provide an appliance of the character described which may be formed of resilient and elastic material, such as rubber, or yielding absorbent material such as paper; to provide such a device which shall be simple in structure and easy in application and use, and to obtain other advantages and results as will be brought out by the following description and accompanying drawing.

Referring to the drawing,

Figure 1 is a vertical sectional view through a dental appliance embodying the invention showing it in operative position between jaws which are fragmentarily illustrated.

Figure 2 is a transverse vertical sectional view on the line 2—2 of Figure 1.

Figure 3 is a top plan view of the device.

Figure 4 is a side elevation thereof.

Figure 5 is a sectional view on the line 5—5 of Figure 3.

Figure 6 is a similar view on the line 6—6 of Figure 3.

Figure 7 is a side elevation of a modification of the invention.

Figure 8 is a sectional view similar to Figure 5 of the form of the invention shown in Figure 7, and Figure 9 is a view similar to Figure 6 showing a further modification.

Specifically describing the embodiment of the invention illustrated in Figures 1 to 6 inclusive, the device or appliance includes a cup-shaped body 1 of suitable material such as resilient rubber or rubber composition, or yielding absorbent paper or equivalent materials. Preferably the device is approximately circular in plan and has at one end a recess 2 of a size approximating the size of the portion of a tooth which projects above the gum. If desired, the device may be made in different sizes and shapes to accommodate different teeth. Preferably diametrically opposite arcuate portions of the side walls of the cup indicated at 3 are of less thickness than the other portions of the walls and terminate in thin edges 4 so as to be highly resilient and flexible and at the rim of the cup between the portions 3 are diametrically opposite arcuate wings 5 which preferably have inwardly projecting angular shoulders 6.

In use of the device, assuming it to be utilized for the purpose of maintaining in dry condition a tooth to which an orthodontia band is to be applied, after the tooth has been cleaned and dried by the operator so as to be ready for the reception of the band, the device I is inserted between the jaws of the wall of the patient so that the recess 2 embraces and surrounds the tooth A being operated upon, whereupon the patient will bite down upon or squeeze the device between his jaws, as shown in Figures 1 and 2.

The portions 3 of the device are preferably located in juxtaposition to the teeth that are adjacent the tooth being operated upon, while the wings 5 are located at the buccal and lingual side respectively of the tooth so as to grip the tooth adjacent its gingival margins as shown in Figure 2. The thin edged flexible portions 3 may easily wedge between the teeth as shown at B or be deformed and tightly rest against the teeth or the gums as shown at C depending upon the position at which the device is used and the shape and size of the teeth. The edges or rim of the recess 2 are thus arranged in substantially moisture tight engagement with the juxtaposed portions of the teeth and gums so that entrance of moisture into the recess and around the tooth A is prevented, whereby the tooth may be maintained in perfectly dry and sanitary condition.

For convenience in centering the device on the tooth and between the jaws and holding it against slipping, the base of the recess 2 may have an upstanding resilient boss 7 for entering the depression formed by the cusps of the tooth being treated, while the end of the body I opposite the recess 2 may have the concavity 8 to approximately conform to the crown of the tooth opposed to the tooth A in the other jaw.

Where the body I is formed of resilient rubber or like non-absorbent material, it may be desirable to place in the recess 2 a sheet 9 of suitable absorbent material such as absorbent paper, to absorb any moisture which might possibly remain on the tooth A at the time the device is applied thereto, for example, condensation of the breath of the patient on the tooth, or moisture which might exude between the gums and the tooth. If desired, the device may have two oppositely facing recesses 10 and 11 each corresponding to the recess 2 as shown in Figures 7 and 8, the wall of each to embrace or surround one of two opposite teeth.

In the use of the device as an applicator for a medicinal solution, for example an astringent, the medicine is placed in the recess 2, whereupon the device is gripped between the jaws of the patient in the same manner as shown in Figures 1 and 2 so that the medicine is held in contact with the tooth and gums.

In use of the device for exercising the gums, the device is simply gripped between the jaws so as to contact with the area of the gums to be exercised and the patient alternately squeezes and releases the device between his jaws so as to alternately exert and relieve pressure on the gums.

Other uses of the device will occur to those skilled in the art as within the spirit or scope of the invention, and many modifications and changes may be made in the details of structure of the device without departing from the spirit or scope of the invention.

Having thus described my invention, what I claim is:

1. A device of the character described comprising a body formed of yieldable material to be gripped and held by and between the jaws of the patient and having a cup-like recess to receive and tightly enclose within it the exposed portion of a tooth to be treated, diametrically opposite arcuate portions of the rim of said recess having upstanding wings projecting therefrom to engage the lingual and buccal sides respectively of the tooth adjacent the gingival margins, said body and rim being deformable so that the rim will snugly contact with portions of the gum and teeth and enclose within said recess the portions of the gum and tooth encompassed by said rim.

2. The device set forth in claim 1 wherein the other portions of said rim are thinner and more flexible than said wings to tightly wedge between the tooth being treated and adjacent teeth.

CHARLES A. SPAHN.